United States Patent [19]
Evans

[11] Patent Number: 4,514,814
[45] Date of Patent: Apr. 30, 1985

[54] MULTI-PROCESSOR AXIS CONTROL

[75] Inventor: John T. Evans, Waynesboro, Va.

[73] Assignee: General Electric Company, Charlottesville, Va.

[21] Appl. No.: 415,507

[22] Filed: Sep. 7, 1982

[51] Int. Cl.³ .................. G06F 15/46; G05B 19/18
[52] U.S. Cl. .............................. 364/474; 364/132; 364/138
[58] Field of Search ............ 364/474, 475, 131, 132, 364/133, 134, 137, 138, 136, 900, 200

[56] References Cited

U.S. PATENT DOCUMENTS

| | | | |
|---|---|---|---|
| 4,079,235 | 3/1978 | Froyd et al. | 364/134 |
| 4,109,185 | 8/1978 | Froyd et al. | 364/134 |
| 4,118,771 | 10/1978 | Pomella et al. | 364/134 |
| 4,123,794 | 10/1978 | Matsumoto | 364/132 |
| 4,149,235 | 4/1979 | Froyd et al. | 364/134 |
| 4,262,336 | 4/1981 | Pritchard | 364/132 |

Primary Examiner—Joseph Ruggiero
Assistant Examiner—Louis Woo
Attorney, Agent, or Firm—Ormand R. Austin

[57] ABSTRACT

A method for operating a computer controlled industrial machine in which a plurality of axes of motion are independently controlled. The method utilizes programmable data processors to enable the production of motion command signals to the servo drives of the machine. In one embodiment, coordinated motion of several axes is attained by programmably grouping axes into motion groups. Each motion group has an assigned master processor which coordinates the operation of all axis processors in that group. The axis processors can be re-assigned to any other motion group while a programmed motion is being performed.

6 Claims, 15 Drawing Figures

Microfiche Appendix Included
(1 Microfiche, 78 Pages)

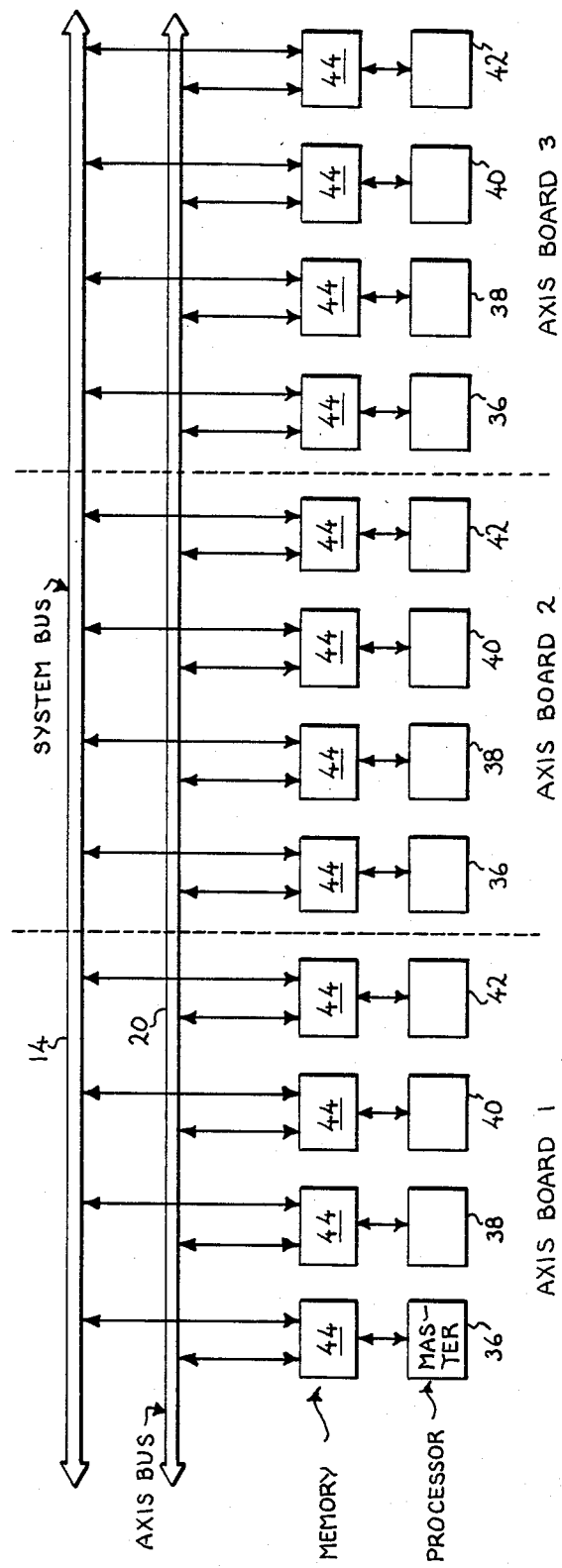
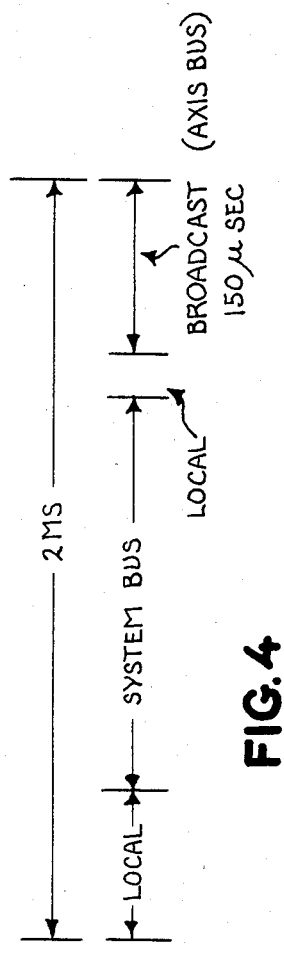
FIG. 2
FIG. 4

MULTI-PROCESSOR AXIS CONTROL

Reference is made to a microfiche appendix forming a part of this application comprising one microfiche containing 78 frames.

BACKGROUND OF THE INVENTION

The present invention relates to computer numerical control systems and, more particularly, to control systems for industrial machines having a plurality of controllable axes of motion in which selected independent axes are motion coordinated.

Industrial machines include classes of machines having limited mobility such as, for example, lathes and milling machines, and classes of machines having broader mobility such as, for example, robots and material handling devices. Each machine typically has several defined axes of motion. A lathe, for example, may include a chuck for holding and causing rotation of a workpiece about a longitudinal axis of the lathe. A tool moveably mounted to the lathe bed may have one axis of motion parallel to the longitudinal axis of the lathe and a second axis of motion perpendicular to the longitudinal axis. Each axis of motion may be independent of any other axis or in some instances may be totally dependent such as in a thread cutting procedure during which the tool motion is coordinated with the rotation of the workpiece.

In numerous applications independent motions in one axis may periodically be required to coordinate with motion in another axis. For example, in a multiple arm robot one arm might pick up a bolt while another arm picks up a nut. Although those two actions are independent, if the robot then assembles the bolt and nut, the assembly process requires a coordination between the two arms, i.e., the two controlled axes of motion. In actual practice the two robot arms may have several axes of motion since the arm normally terminates in an end effector or clamping mechanism attached to the arm by a "wrist" which permits roll, yaw and pitch motions. Each of these motions require independent control actions for picking up an object but may also require coordinated actions during the process or for subsequent assembly procedures.

In computer numerical control (CNC) systems, axis motion is specified by a computer program. The program may specify independent motion in each controllable axis or may specify coordinated motion between two or more axes. So long as the axes for which coordinated motion is desired are defined by the machine system as being within a definable motion group, the coordinated motion can be achieved. For example, in those instances in which it is known that two or more motion axes are to be coordinated, such as in cutting a circle, systems are available which provide for coordinated motion of the two independent axes. However, such systems do not provide for switching between coordinated and independent control during a programmed machining process wherein various axes of motion may be grouped according to the desired machining motion.

OBJECT OF THE INVENTION

It is an object of the present invention to provide an improved axis control system for a computer controlled machine system.

It is another object of the present invention to provide an axis control system which permits independent and coordinated axis motion through computer program assignment.

It is still another object of the invention to provide an axis control system which permits random grouping of axes into motion control groups.

SUMMARY

In accordance with one form of the present invention, a CNC system includes a plurality of axis data processing units, each processing unit being adapted to provide axis motion instruction data to a predetermined controllable axis of an industrial machine. A plurality of supervisory data processing units are provided, one for each possible coordinated motion group, for supplying control signals to the axis data processing units. A central processing unit (CPU) and associated memory unit direct a flow of instructions to the supervisory and axis processing units. The CPU provides, in response to a computer program, set-up data to the axis processing units defining a mode of operation for each unit and assigning the unit to a motion group. Motion data is transferred to local memory units associated with each axis processing unit on a demand basis. The supervisory processing units assure that axis units assigned to them, respectively, process the motion data at a proper rate. The CPU re-assigns axis processing units to different motion groups while a program is being run in accordance with the program definition of coordinated axis groups.

DESCRIPTION OF THE DRAWING

For a better understanding of the present invention, reference may be made to the following detailed description taken in conjunction with the accompanying drawing in which:

FIG. 2 is a stylized block diagram illustrating one arrangement of a plural axis data processing system;

FIG. 4 is a timing diagram for the transmission of data between axis processing units;

DETAILED DESCRIPTION

Figure 1:
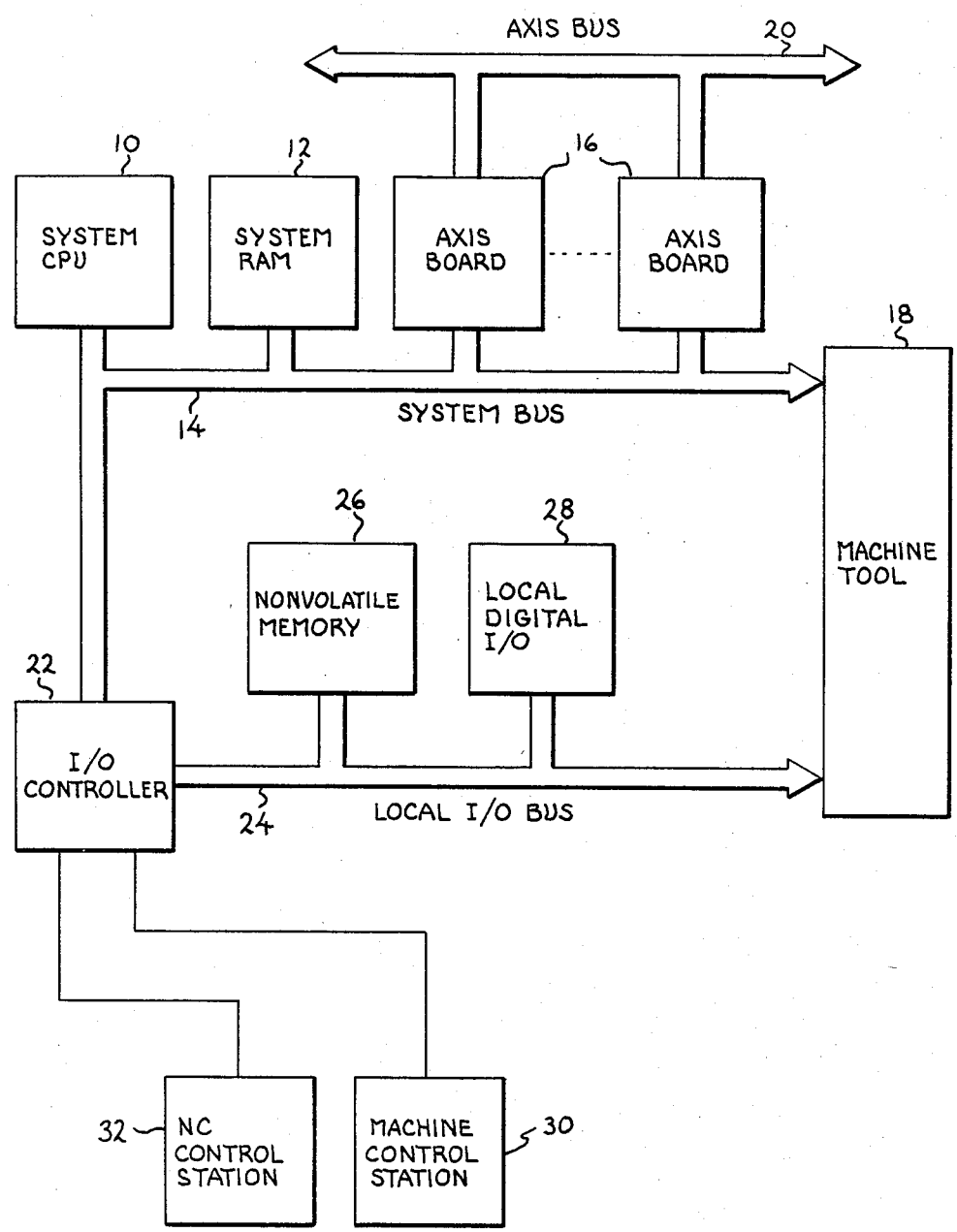
FIG. 1 is a simplified block diagram of a computer numerical control system.

Referring now to FIG. 1, there is illustrated a simplified block diagram of a computer numerical control (CNC) system incorporating the teaching of the present invention. A system central processing unit (CPU) 10 based upon Intel 8086 and 8087 microprocessors performs processing operations for the system. A system dynamic RAM 12 (ramdom access memory) contains read-write memory for the system and is coupled to the system CPU 10 and other functional portions of the system through a system bus 14. A plurality of axis boards 16 connected to the bus 14 provide control functions for each driven axis of a machine tool 18. Each axis board 16 contains three microcomputers for processing axis functions and one microcomputer which serves as a front end processor or supervisory processor to coordinate a group of axes. Each axis is associated with a separate microcomputer which performs processing operations for that axis. Grouping of axis processors is independent of the particular board 16 upon which the axis micro-computer is located. Because the axis microcomputers can be grouped independently of board location, a separate axis communication bus 20 is provided between the boards 16.

An input-output (I/O) controller 22 coordinates system bus I/O operations and serves to connect the system bus 14 to a local I/O bus 24. The local I/O bus 24 connects the system to a non-volatile memory 26 in which part programs and all system data which must be preserved are stored. The local I/O bus 24 also is connected to a local digital I/O 28 which is functionally associated with a machine control station 30. The local digital I/O 28 generates digitized actuator control signals and monitors the status of contact inputs.

An NC control station 32 is also connected to the I/O controller 22. The NC control station 32 serves as a front panel to machine tool operators and part programmers. The machine control station 30 is a control panel from which the machine tool operator can perform manual operation and control the execution of part programs.

The CNC illustrated in FIG. 1 operates under control of the system CPU 10 executing programs resident in the system RAM 12. Part programs may be input from an external device such as a paper tape or cassette reader through the I/O controller 22 or through the keyboard of the NC control station 32. Any part program which is input to the system is stored by the I/O controller 22 into non-volatile memory 26. The system CPU 10 directs the execution of part programs through the I/O controller 22 and the axis boards 16. Part programmed axis commands are executed through the axis boards 16 which are connected to the machine tool 18. The machine tool 18 contains axis feed drives which are under control of the axis boards 16. Non-axis commands are executed through the I/O controller 22, connected to the machine tool 18 through the local digital I/O bus 24. Commands entered with pushbuttons and controls on machine control station 30 are communicated to the I/O controller 22 and finally to the machine tool 18 through either the axis boards 16 or the local digital I/O bus 24.

As is well known, a CNC as with most other computer control systems has evolved from a hardwired system into essentially a computer architecture which is customized into a firmware control system through the use of software. Computer programs, i.e., software, provide the method for reconfiguring each of these computer systems into a system equivalent to those earlier hardwired systems. The method disclosed in this application is thus configured in the form of a computer program which forces the hardware system illustrated in FIG. 2 to operate in a particular fashion in order to implement the improved method.

Referring now to FIG. 2, there is shown a highly stylized block diagram of the arrangement of the axis boards 16 for a system in which three axis boards are required. Each of the axis boards comprises a supervisory or front end processor 36 and three additional microcomputers 38, 40 and 42. Connected to each of the microcomputers is a corresponding one of a plurality of read-write memories 44. Although various types of microcomputers or microprocessors could be utilized for the processors 36 through 42, in a preferred embodiment each of the processors comprises a type 8051 microcomputer available from Intel Corporation. For purposes of description it will be understood that the terms processor, microprocessor and microcomputer are used interchangeably.

Each of the axis boards is substantially identical as far as hardware arrangement is concerned. Referring now to that portion of the diagram illustrated as axis board number 1, it can be seen that each of the memories 44 is connected for access both from the system bus 14 and the axis bus 20. Since each of the axis boards must cooperate with each of the other axis boards, one of the supervisory processors 36 is designated as a master supervisory processor and, as such, provides the additional timing and control signals necessary to effect communication between each of the microcomputers. For purposes of this description, it will be assumed that the processor 36 on axis board number 1 has been designated as a master supervisory processor.

As previously disclosed, the grouping of axis controls or axis microcomputers into coordinated motion groups is independent of the location of an axis microcomputer on a particular board. For example, the microcomputers 38 could all be defined to be part of the same group even though such a motion group would require grouping of microcomputers from each of the axis boards 16. Alternately, the microcomputers 38 and 40 from axis board 1 could be grouped with any one or more of the microcomputers from any of the other axis boards located in the system. When axis control microcomputers are formed into groups, each group is assigned to one of the supervisory microprocessors 36. Accordingly, the system as presently constructed will only accomodate as many groups as there are supervisory processors. Since the present arrangement provides only one supervisory processor per axis board, in a system of the type illustrated in FIG. 2 having three axis boards, only three defined motion groups are possible. Within each axis board 16, the particular hardware connections determine which of the microcomputers will become the supervisory processor. However, the designation of a particular microcomputer as part of a particular motion group is determined by set-up constants, one type of data written to the axis board by the CPU 10. The first data written to the axis board by the CPU 10, after the initialization following power being applied, are always set-up constants. Set-up constants may be changed at any time as required. The grouping of axes is normally determined by the configuration of the particular machine or machine tool to which the CNC is connected, but there may be situations where it is desirable to dynamically change this grouping. This may be done by, for example, changing the set-up constants through part programming. An example of a preferred use of software for controlling grouping might be in a situation involving coordination of independent axis controls such as a multiarm robot. If the robot were designed to independently obtain two elements and then to subsequently assemble the two elements, the part program instructions would require that the assembly operation be performed by coordinating the axes controlling each arm. This operation would likely require more than one axis per arm since each arm end effector or clamp is generally capable of roll, yaw and pitch motions. In such an arrangement, the software program would assign the coordinated axes to a particular supervisory processor for the last portion of the detailed move. In order to permit the microcomputers on each of the boards to be formed into groups without regard to the location of the particular microcomputer, it becomes necessary for each microcomputer to have access to move or position data associated with each of the other microcomputers. In a preferred embodiment, this coordinated information transfer is effected by assigning first locations in the one of the memories 44 associated with the processor 36, to accept data from microprocessor 36 and similar first locations in each of the other memories 44 to periodically receive a copy of this data. Similarly, second locations are assigned in the one of the memories 44 associated with the processor 38 to accept data from processor 38 and similar second locations in each of the other memories 44 for receiving copies of this data. Additional assignments are made so that each of the memories 44 has locations for data to be copied and locations for receiving copies of data from all other memories. The transfer of this data is effected through the master microprocessor 36 which provides synchronizing signals to effect the transfer at appropriate times. In a typical operation of transferring the data, or broadcasting data, which will hereinafter be referred to as a broadcast mode, the master processor 36 puts a read signal out to one of the memories 44 and a write signal to each of the other memories while addressing all memories 44. In the illustrative embodiment, memories 44 are 256 byte memories. An 8-bit address defines a location. An additional four address bits (A8–A11) distinguish one of the 12 memories 44.

In order to copy data from one of the memories 44 into all others, the lower eight bits of an address are supplied to all memories and the additional four bits of address, A8–A11, are used to denote which of the memories is read. All others receive a write signal. This determination of read or write is made in read/write decode logic 62 (shown in FIG. 3). The result is to cause data located in particular memory locations in the first of the memories 44 to be duplicated in locations in each of the other memories 44. The master processor 36 then sequentially steps through the addresses of all data to be broadcast in each of the memories 44, thereby duplicating the memory data in this portion of each of the memories. Within the memories 44, unique address locations are assigned for move information from each axis microcomputer. Thus, in the event that one of the processors 40 is in the motion group with one of the processors 38, the processor 40 will always know where to look within the memory area to obtain the latest move data provided by the processor 38.

Figure 3A:
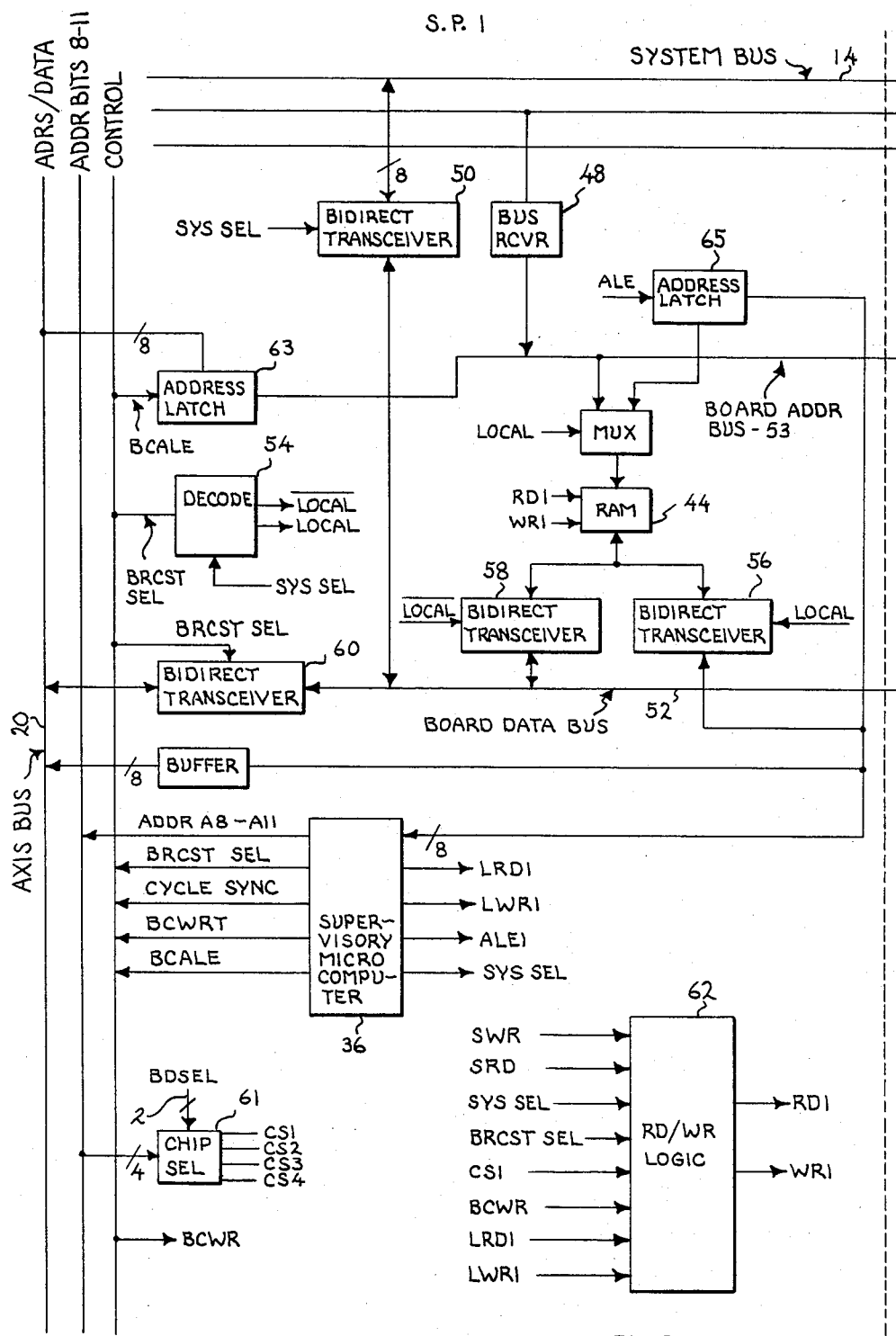
FIG. 3 comprising 3A and 3B is a simplified block diagram of a hardware implementation of the processing system of FIG. 2.
Figure 3B:
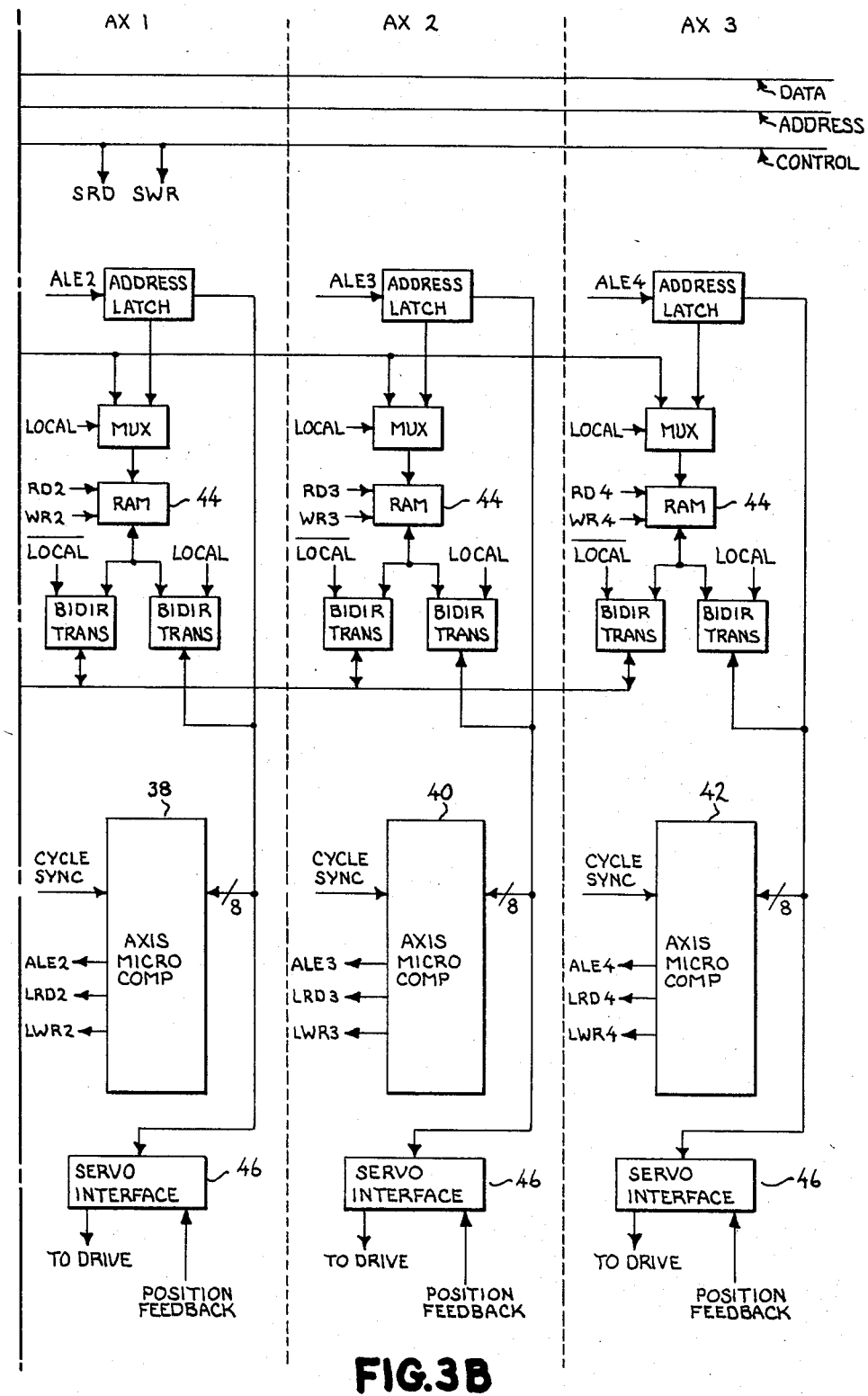

Referring now to FIG. 3, comprising the two sheets labeled FIG. 3A and FIG. 3B, there is shown a simplified block diagram of one of the axis boards 16. As can be seen, each of the axis boards 16 is divided into four sections: A first section designated as the supervisory processor section 1 (SP1), a second section designated as axis 1, a third section designated as axis 2 and a fourth section designated as axis 3. The sections axis 1 through axis 3 are each identical. The supervisory processor section is substantially the same as the axis processor sections with certain additional components required because of the supervisory nature of the microcomputer 36. However, as previously disclosed, each of the microcomputers 36, 38, 40 and 42 may comprise a type 8051 microcomputer. In addition to the interface circuitry which distinguishes the supervisory processor from an axis processor, the axis processor sections also each contain a servo interface 46. The servo interface 46 provides the drive signals to the control servos on the machine tool 18 and also receive the position feedback information from position feedback devices mounted on the machine tool.

As described with respect to FIG. 2, each of the microcomputers 36 through 42 have associated with it one of the memories 44, sometimes referred to as RAM. In addition, each of the memories 44 and the microcomputers 36 through 42 have substantially identical hardware interconnections between the memories 44 and a board data bus 52 and a board address bus 53. For ease of illustration, each bus 14 and 20 is shown as comprising a data bus, an address bus and a control bus. As is well known, the address information on the system bus identifies the particular RAM memory location to which data is to be transmitted on the bus 14 or from which data within the memory is to be communicated on bus 14 back to the CPU 10. In the arrangement shown, the data on bus 14 is passed through a bidirectional transceiver 50 to the board data bus 52 and then through bidirectional transceiver 58 to the memories 44. The bidirectional transceiver 50 is controlled by a system select (SYS SEL) signal provided by the supervisory processor 36 on that board. Bidirectional transceivers 58 are controlled by the inverted LOCAL signal from decode logic 54. Data transfer between each microcomputer and its associated memory occurs through a corresponding bidirectional transceiver 56. Each transceiver 56 is controlled by a LOCAL signal generated by the decode logic 54.

The master supervisory microcomputer 36 provides onto the axis control bus 20 during the broadcast mode a broadcast select signal (BRCST SEL) for enabling the bidirectional transceiver 60, a broadcast write signal (BCWRT), a broadcast address latch enable signal (BCALE), and the upper four bits of address (A8–A11) for identifying memories 44 being addressed. The BCWRT and BCALE signals are used in a manner well known in the art. The master supervisor processor 36 also provides a cycle sync signal via the axis bus 20 to all of the microcomputers on all of the axis boards 16 in order to synchronize their operation. The signals just described and as shown on FIG. 3A as emitting from supervisory processor 36 are only generated by the assigned master supervisory processor 36.

In the broadcast mode data transfer between memories 44 occurs through bidirectional transceivers 58 which are also controlled by the LOCAL signal from the decode logic 54. In this instance, the transceivers 58 are energized by the inverted LOCAL signal, i.e., $\overline{\text{LOCAL}}$. Direction signals required by the bidirectional transceivers are derived from the appropriate read and write signals in a manner well understood. Information to be transferred between boards also passes through the bidirectional transceiver 60 energized by the broadcast select signal BRCST SEL, which signal originates at the master supervisory microcomputer 36. Read and write signals (RD and WR) for each of the memories 44 are supplied from the associated read/write logic circuit 62. A read/write logic circuit 62, as shown in FIG. 3A for the SP1 section, is also required for each of the sections AX1, AX2 and AX3 illustrated in FIG. 3B, although the circuit 62 is not shown in the latter figure. Read/write logic circuit 62 receives system read and write commands (SRD and SWR) from the system control bus 14, broadcast write (BCWR) and broadcast select (BRCST SEL) from the axis bus 20, system select signal (SYS SEL) from the board supervisor 36, a chip select signal (CS1) from chip select circuit 61, and a local read (LRD1) and a local write (LWR1) signals from the associated microcomputer for that section. These received signals are used in combination to produce read or write signals as needed for the memories 44.

Chip select circuit 61 receives the four address bits A8, A9, A10 and A11 from the axis bus 20, and two board select signals from switches on the board. The board select switches are set at time of installation to select one of up to four boards. The address bits A8-A11 are written by the master supervisor processor 36 to select the particular one of the memories 44 to be read during each step of the broadcast mode. Chip select circuit 61 uses the board select signals and four address bits to produce chip select signals CS1, CS2, CS3 and CS4 as needed to identify which of the memories 44 is to be read. Each of the memories 44 also has associated with it an address latch 65 both for addressing the memories for the purpose of writing data in and for addressing the memories for reading data out when its associated microcomputer is communicating with the memories 44. The use of address latches and the manner in which addresses are supplied from a microcomputer to the address latches are well known in the art and will not be described herein. As previously described, the microcomputer 36 acting as a supervisory or master processor for the axis control system supplies a timing signal cycle sync for the purpose of synchronizing the operation of each of the other microcomputers in the system. The supervisory processor 36 on each axis board supplies a timing signal SYS SEL for defining the time periods during which data transfers between the system bus and the axis boards. The master supervisory processor 36 supplies a BRCST SEL signal to control the time periods for transfer of data between the various microcomputer memories 44 on the axis boards.

Referring now briefly to FIG. 4, there is shown a timing diagram indicating the timing established by the microcomputer 36 for exchanging data between the axis microcomputers and the system bus. A typical cycle time for the system might be in the order of two milliseconds depending upon the complexity and the number of tasks required to be performed. As previously described, the master supervisory processor 36 provides the signal CYCLE SYNC for the purpose of synchronizing the program of all the microcomputers in the axis board. During that cycle time period two portions are set aside for local communications and a larger time is set aside for system bus communications between the board microcomputers and the system processor. During the system bus time period, the central processor 10 can read data from or write data to each of the memory units making up the various supervisory and axis control units. The microcomputer 36 also establishes a portion of the two milliseconds timing cycle for broadcasting data between the memory units 44. The timing cycle might allocate for example 150 microseconds to the broadcast time.

Figure 5:
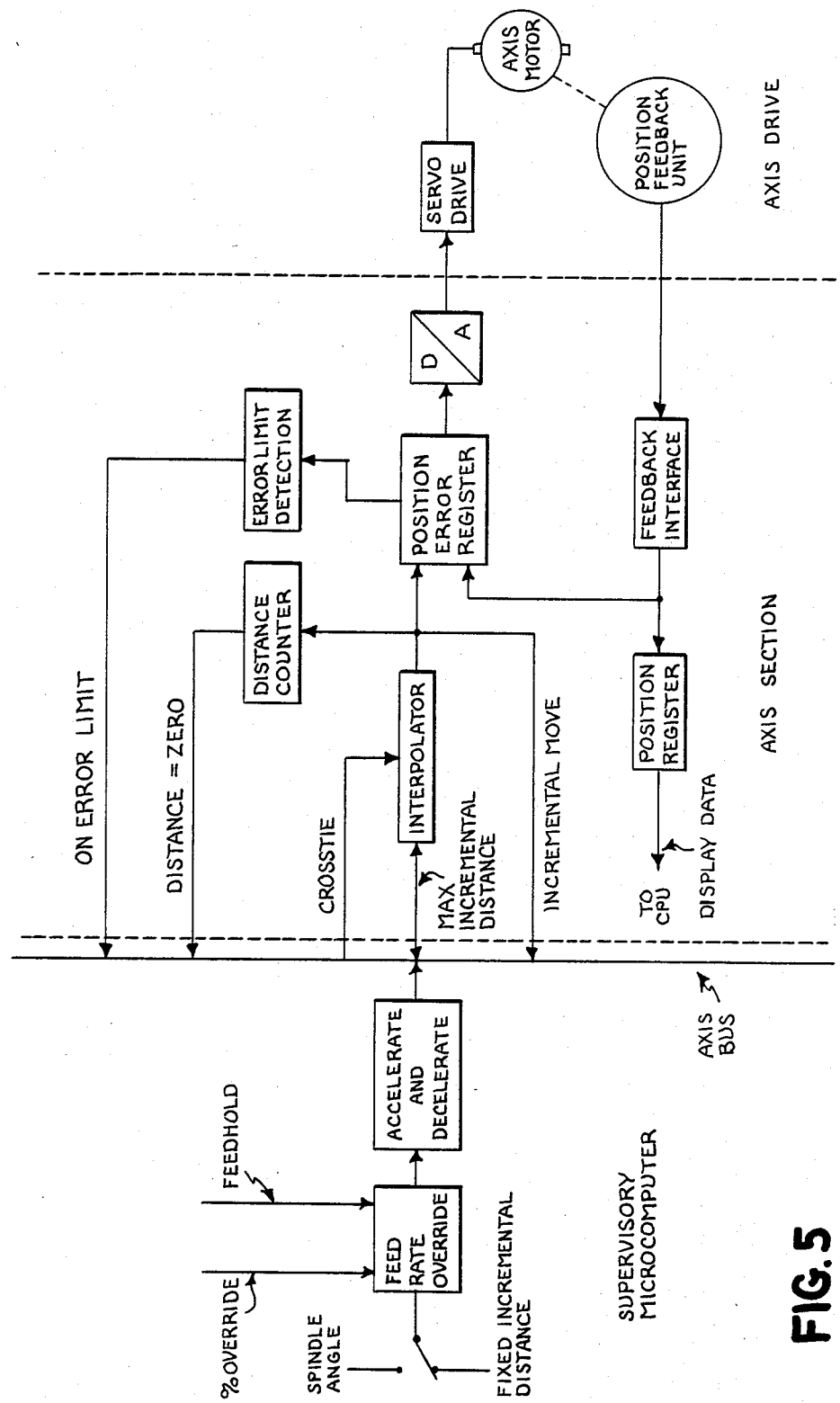
FIG. 5 is a simplified functional block diagram of a single axis processor operation.

For a better understanding of the present invention reference may be made now to FIG. 5 which illustrates a functional block diagram for the operation of one axis section. In one type of operation, the supervisory microcomputer 36 provides to each of the axis microcomputers in its group a value indicative of the maximum distance for which the axis associated with that microcomputer may be driven during each cycle time. The value of this signal may be varied by a feedrate override control value set by a machine tool operator. This control value, indicated as a percent override signal, is supplied to the supervisory microcomputer. The value can be reduced to zero by providing a feedhold command to essentially stop all motion. The signal from the supervisory microcomputer may also be varied as a function of an acceleration or deceleration component if it is desired to reduce the rate of travel at the start of a move or as the machine tool approaches a final position. Unless a percent override signal is provided to the supervisory microcomputer or acceleration and deceleration control is applied, the value supplied to the axis microcomputer is essentially at a fixed rate. However, if the system is placed into a threadcutting or other mode of operation in which the distance travelled by the axis must be proportional to the revolutions of the spindle, then a value proportional to spindle angle change in the two millisecond period is used in place of a fixed value. Although not shown, one axis section of an axis board may be used to provide the interface to a spindle position transducer and to measure spindle angle change. This value of spindle angle change is then transmitted during broadcast time to the supervisory processor.

Within the axis microcomputer, an interpolator receives the maximum distance value signal from the supervisory microcomputer and converts that signal into a signal representative of the distance which the axis being controlled by this particular microcomputer is to move during the cycle time. Within the microcomputer a distance counter which has previously been loaded with a total distance for which the axis is to move is updated by subtracting from the value in the distance counter the signal generated by the interpolator. As a result, the value stored in the distance counter is reduced towards zero during each cycle time by the value produced by the interpolator. When the value stored in the distance counter reaches zero, a signal is produced indicating that that axis has completed its move and when all axes within a motion group have completed their respective moves, new data is transferred from buffers in the external memory to internal memory in the processor. At this time, the supervisor processor for the motion group generates a service request interrupt to CPU 10 indicating data has been transferred from the external memories 44 to the internal memories in the processors of the motion group and the CPU should write out data for the next operation. The axis microcomputer also contains a position error register which is part of the position feedback control. The output of the position error register is converted to an analog signal and supplied to a servo drive unit contained within the machine tool itself. The actual position of the servo drive of the axis motor is monitored by a position feedback unit which then provides through a feedback interface a signal to the position error register. The microcomputer functions as a position register to provide feedback data indicative of the actual position of the unit controlled by the axis microcomputer.

The axis microcomputer also contains within its program a monitor of the magnitude of error contained within the position error register. The error within the register may become excessive in the event that for some reason the servo drive is unable to closely track the positions commanded by output signals developed by the interpolator. An error limit detection circuit monitors the value stored in the position error register and provides an error limit signal if the stored error becomes larger than the predetermined limit. The error limit signal can be utilized to regulate machining operation or signal an operator of a possible problem.

Figure 6A:
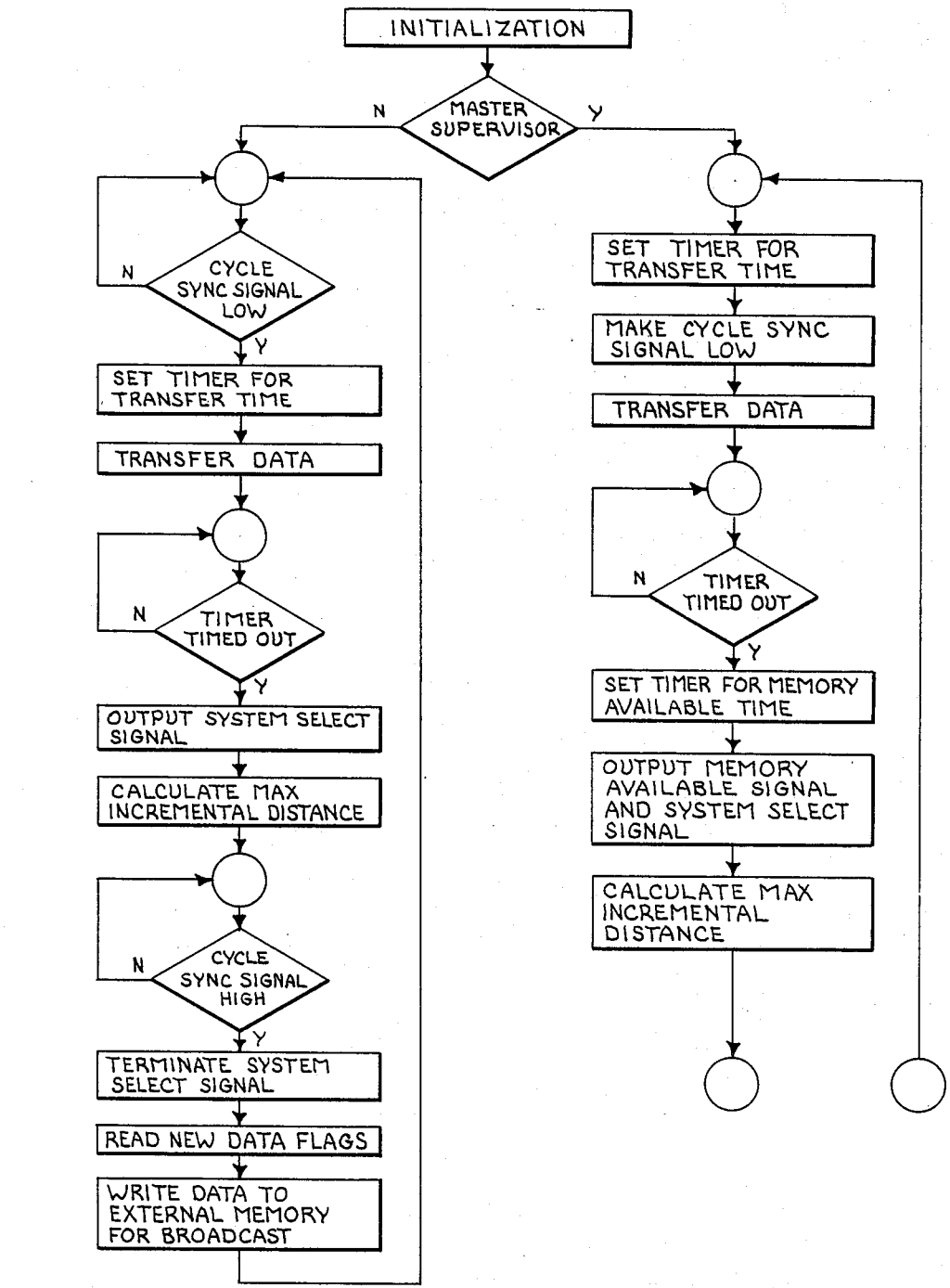
FIGS. 6 comprising 6A and 6B and 9A are computer flow charts illustrating one implementation of the present invention.
Figure 6B:
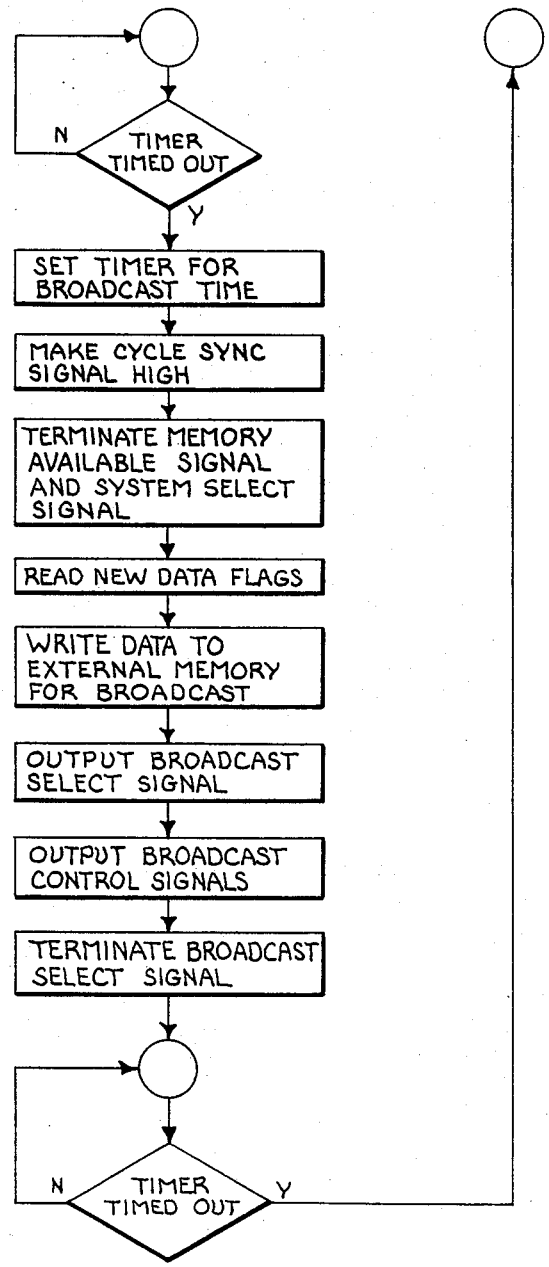

As previously described, the preferred implementation of the present invention is obtained by programming the apparatus described in the preceding figures in a manner to implement the desired operation. Reference is now made to FIG. 6 in which there is shown a flow chart which can be used in conjunction with the computer program attached hereto as an appendix in order to implement the present invention. The preferred embodiment of the system illustrated in FIG. 1 utilizes Intel Corporation microprocessors and microcomputers and as such utilizes programming techniques well known in the art. Accordingly, the description of an overall system executive program for the CPU 10 for interfacing with the axis control implemented within the axis board 16 is not believed necessary. FIG. 6 illustrates a high level flow chart for the supervisory microprocessors utilized in the axis control board 16. The supervisory program is initialized when power is first applied to the system. At the beginning of the operation of the program, the supervisory processor must first determine whether or not it is to be the master supervisory processor. If so, then it must perform the additional tasks required of the master supervisory microcomputer. If the microprocessor or microcomputer is not to be the master, then it has certain idle time while waiting for a cycle sync signal to be supplied from the master supervisory microcomputer. Once this cycle sync signal has been received, the supervisory microcomputer begins to perform several sequential tasks. One of these tasks is to issue the timing signal (SYS SEL) described earlier. The start of this signal is timed from receiving cycle sync and a timer in the microcomputer is set for the time until the start of this signal. The next task is a data transfer task. After the timer has timed out and the system select signal is issued, there follows the task of calculating the maximum incremental distance (feed count) for the motion group assigned to that computer. Once these tasks have been completed, the supervisory microcomputer goes into a loop waiting for the end of the cycle sync signal. At the end of that signal, the system select signal is terminated and the new data flags are received. The new data flags are part of the data written by the CPU to the supervisor's one of the memories 44 indicating new buffer data or new setup data has been loaded to all memories in the motion group. Then the supervisor writes to its external memory its part of the data to be broadcast and the program loops back to the beginning of the non-master portion of the program.

The master supervisory computer, in addition to performing the same task as the other supervisory computers, also has responsibility for setting various timers and for controlling the cycle sync signal. Prior to generating the cycle sync signal, the timer is set establishing a transfer time for transferring data. After generating the cycle sync signal, the master supervisory computer then does a data transfer which is identical to that data transfer performed by all other supervisory computers. The transfer timer is timed out, another timer is set for obtaining the end of the available memory time and a memory available signal is generated to signal the CPU 10 that the system bus time period previously described is starting. The system select signal (SYS SEL) is made true at this time. The master supervisory microcomputer also performs the task of calculating maximum incremental distance. Subsequently, the memory available timer times out, the timer is set for the end of the broadcast time, the cycle sync signal is terminated (made high) to indicate to all other processors that the system bus select time is complete, and the signals memory available and system select are terminated. As with the non-master processor, the new data flags are read from external memories 44 and data to be broadcast is written to the processor's one of the memories 44. Next, the broadcast select signal is issued to the axis bus 20. Then the broadcast addresses and the broadcast write signal already described are written to the axis bus 20. The master supervisory microcomputer then waits for the timeout of the allocated broadcast time and moves back to its initial start point to repeat all the above tasks.

Figure 7:
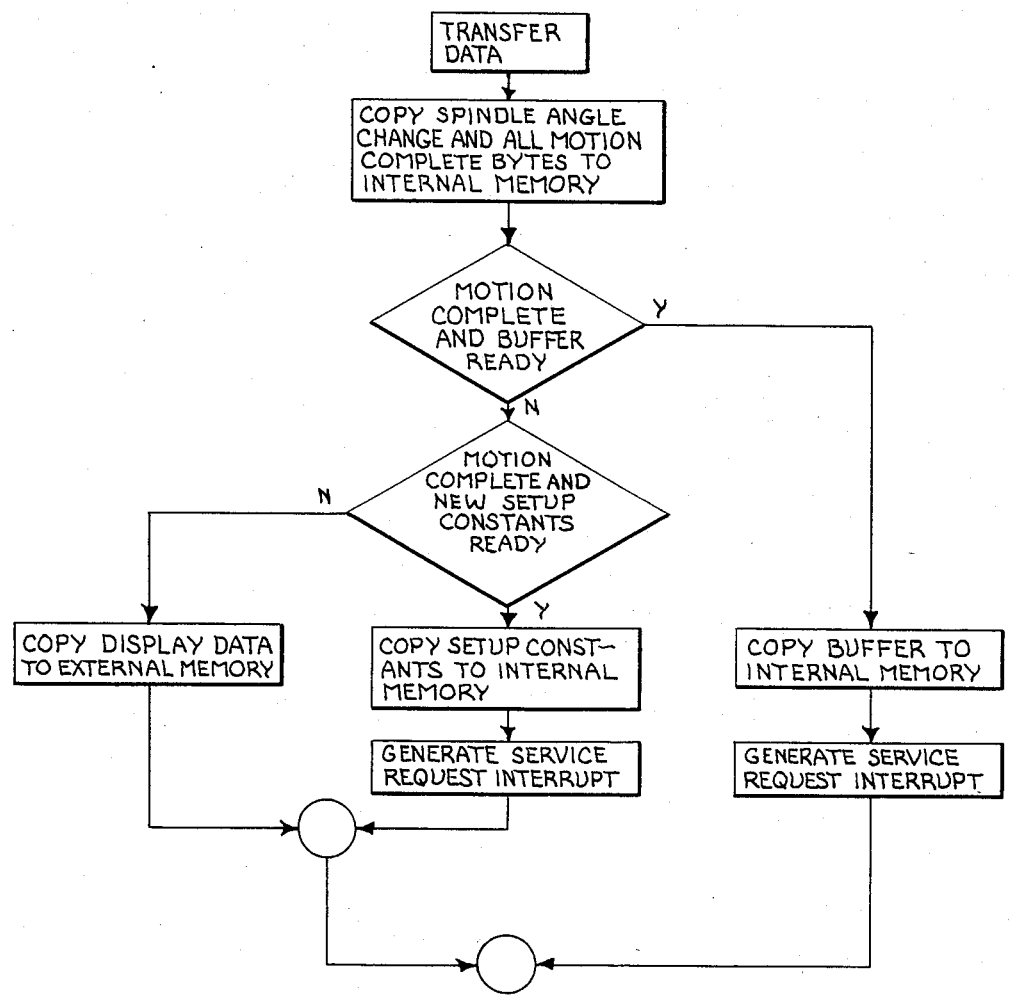
FIGS. 7, 8 and 9B through 12 comprise expanded flow charts illustrating more detail implementations of the major steps in the charts of FIGS. 6 and 9A.

FIG. 7 is an expanded flow diagram for the transfer data task described in FIG. 6. This task first involves copying spindle angle change data and all the motion complete data for axes in the motion group to internal memory from external memory. If the motion has been determined to be complete and new data has been written to the buffer by the CPU, then the buffer data, i.e., the data indicative of the next move to be made by that motion group, is copied from the buffer into internal memory of the microcomputer and a service request interrupt to the system CPU is generated to request new data to be written by the CPU to the buffer in the external memories 44 of processors in the motion group. If the motion is complete but new buffer data is not present in external memory, then a check is made on the new data flag to see if new setup data is in external memory and if it is this data is copied to internal memory. If motion is not complete or there is no new buffer data or no new setup data, then data that could be displayed is copied from the processor's internal memory to a corresponding one of external memories 44 for access by the CPU.

Figure 8:
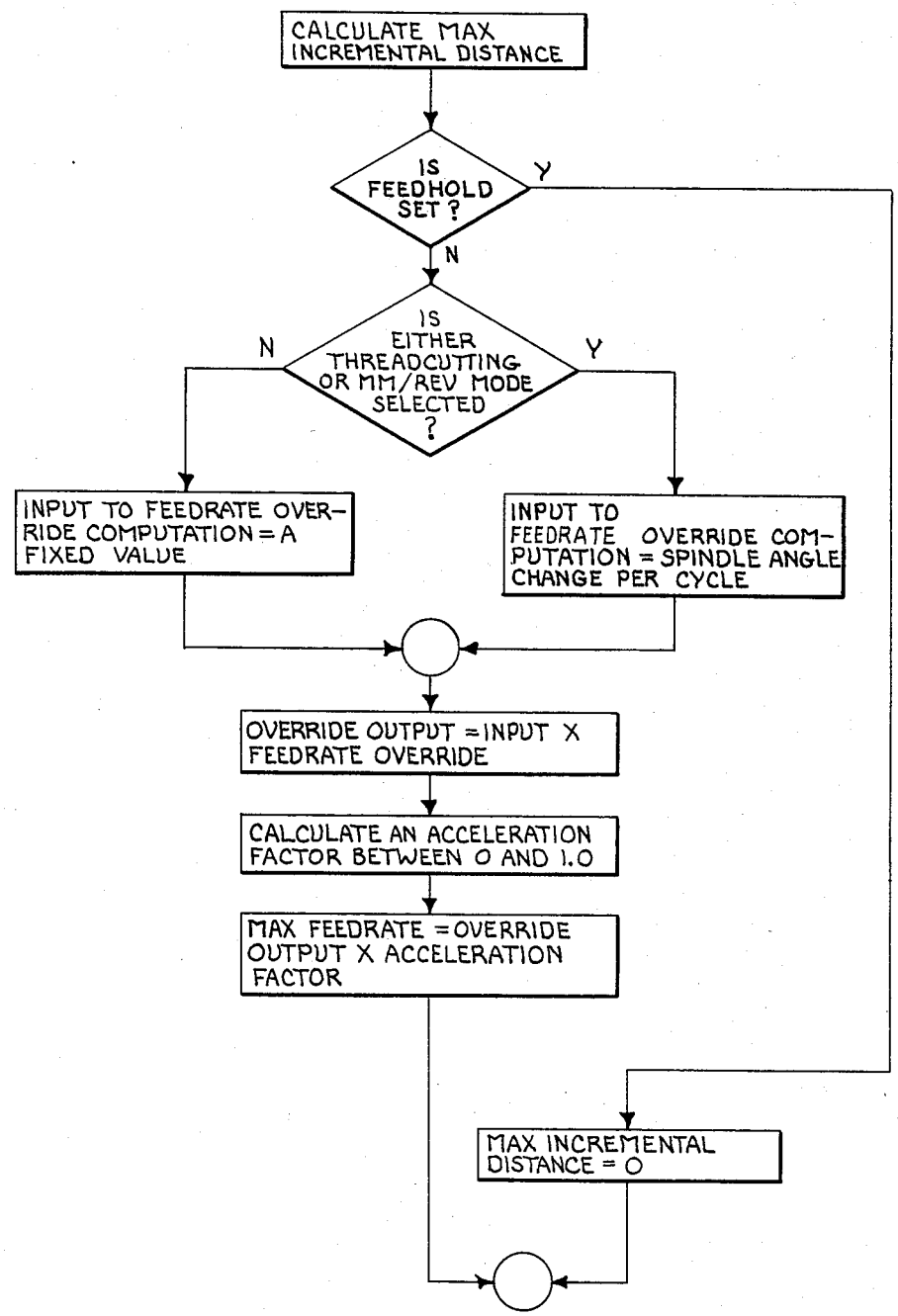

The task of calculating maximum incremental distance is illustrated in FIG. 8. The first check within this task is to determine whether or not a feedhold command has been generated. If feedhold has been generated, then the maximum incremental distance is immediately set to zero since it is therefore desired to stop all axis motion. If the feedhold is not set, then the task determines if the machine is in a threadcutting or a distance per revolution mode. If either of these modes of operation have been selected, then the spindle angle change per cycle is provided as an input signal to the feedrate override for the feedrate override computation. Otherwise, the input to the feedrate override computation is set to a fixed value. For either situation, the override output is set equal to the product of one of the two inputs times the feedrate override signal. This task also determines whether or not there is an acceleration or deceleration factor to be implemented. In either case, the factor is established between zero and one and multiplied times the override output signal in order to generate a maximum incremental distance signal.

Figure 9A:
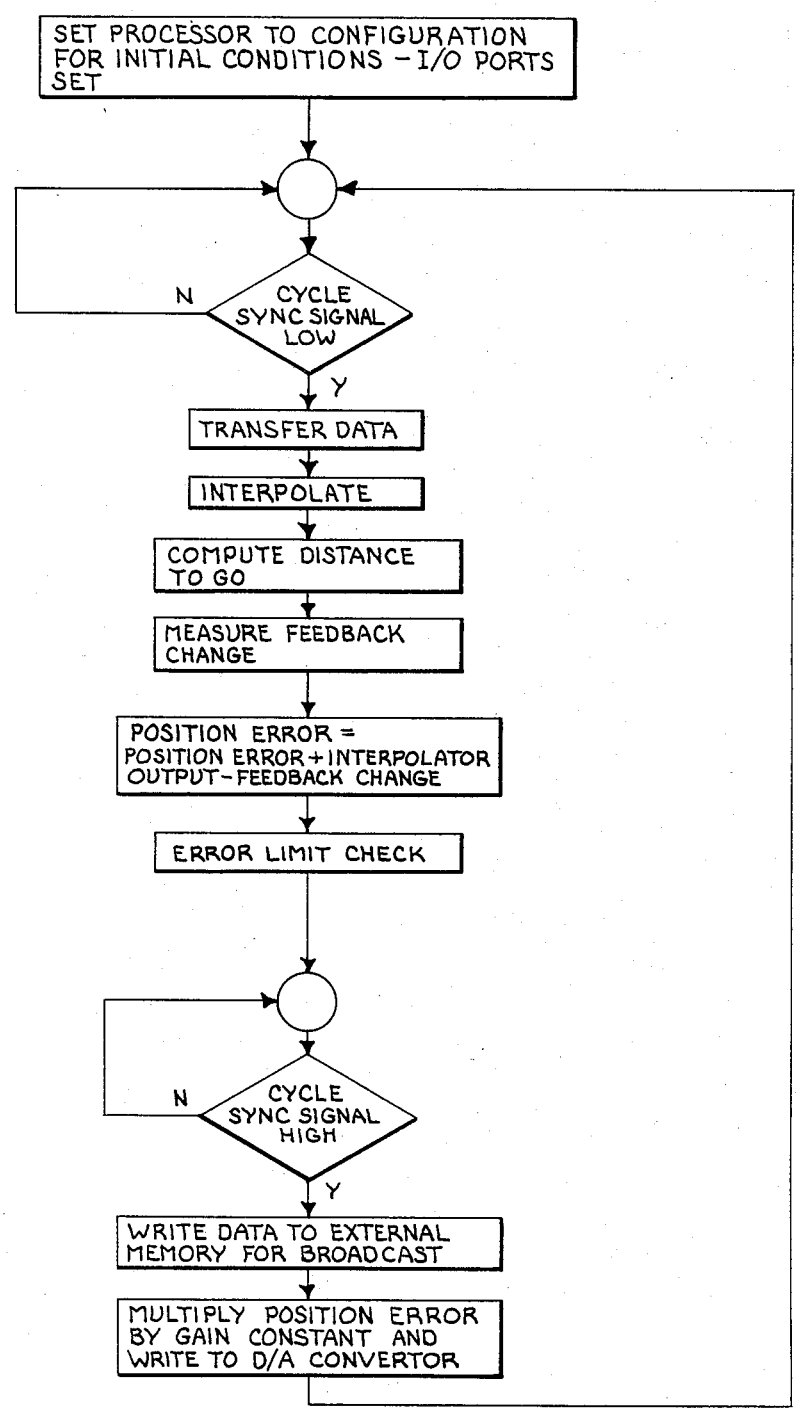
Figure 9B:
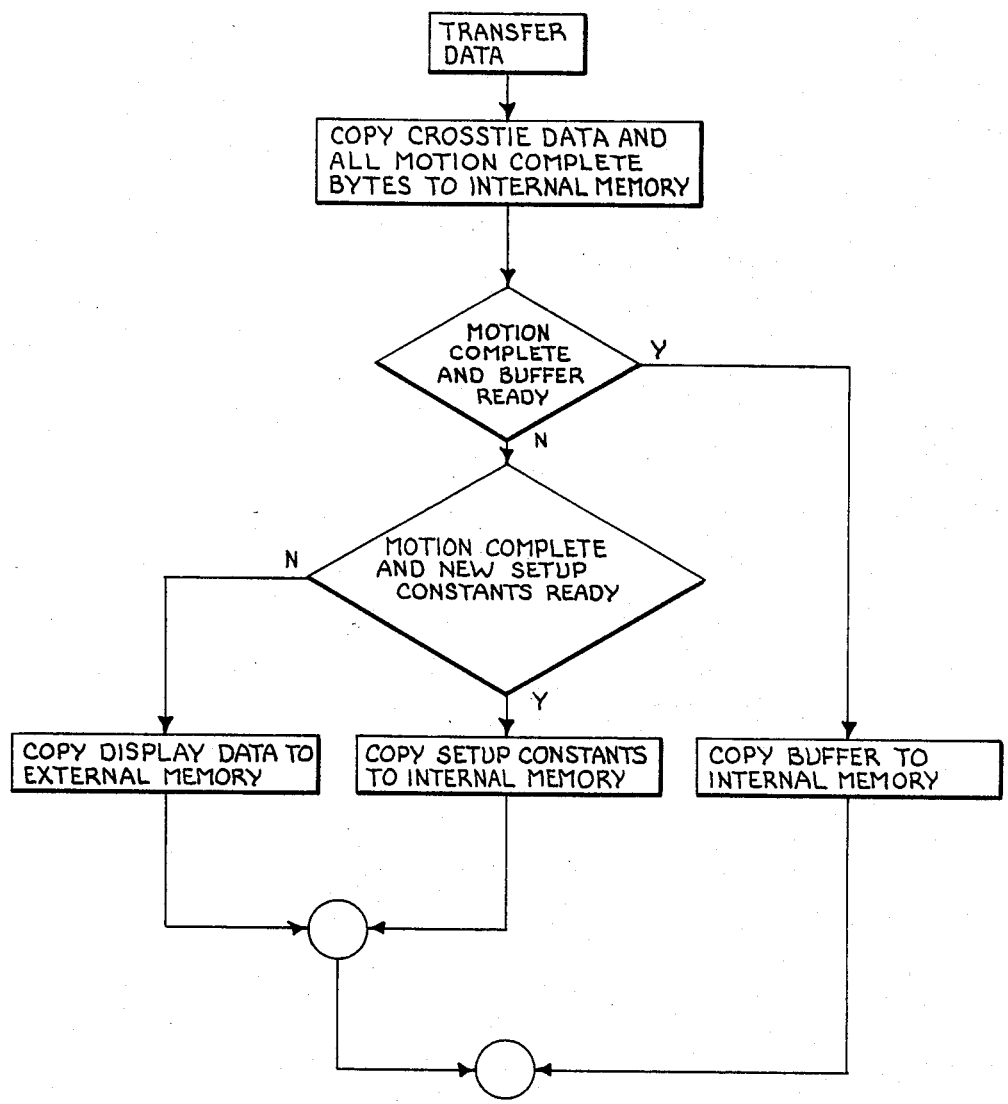

Referring now to FIG. 9A, there is illustrated a flow chart of the overall processing of data in the axis microcomputer. The initialization task sets the processor to the correct configuration for initial conditions, such as setting the I/O ports to their proper state. Once a cycle sync signal has been received, the data transfer is begun and proceeds as shown in the flow chart illustrated in FIG. 9B. This task is similar to the one described for the supervisory processor shown in FIG. 7, differing only in that the axis processor does not generate service request interrupts and crosstie data is copied into internal memory. The data transfer task is then followed by an interpolation task and a distance computation task. The program next steps through the task of measuring the feedback change, computing a position error and determining whether positioning error is within limit. The axis processor now waits for a cycle sync signal indicating the start of the broadcast time. That data which is required to be broadcast is then written to external memory for broadcast mode. Finally, the position error is multiplied by a gain constant in order to set the position loop gain and the result is written to the digital to analog converter.

Figure 10:
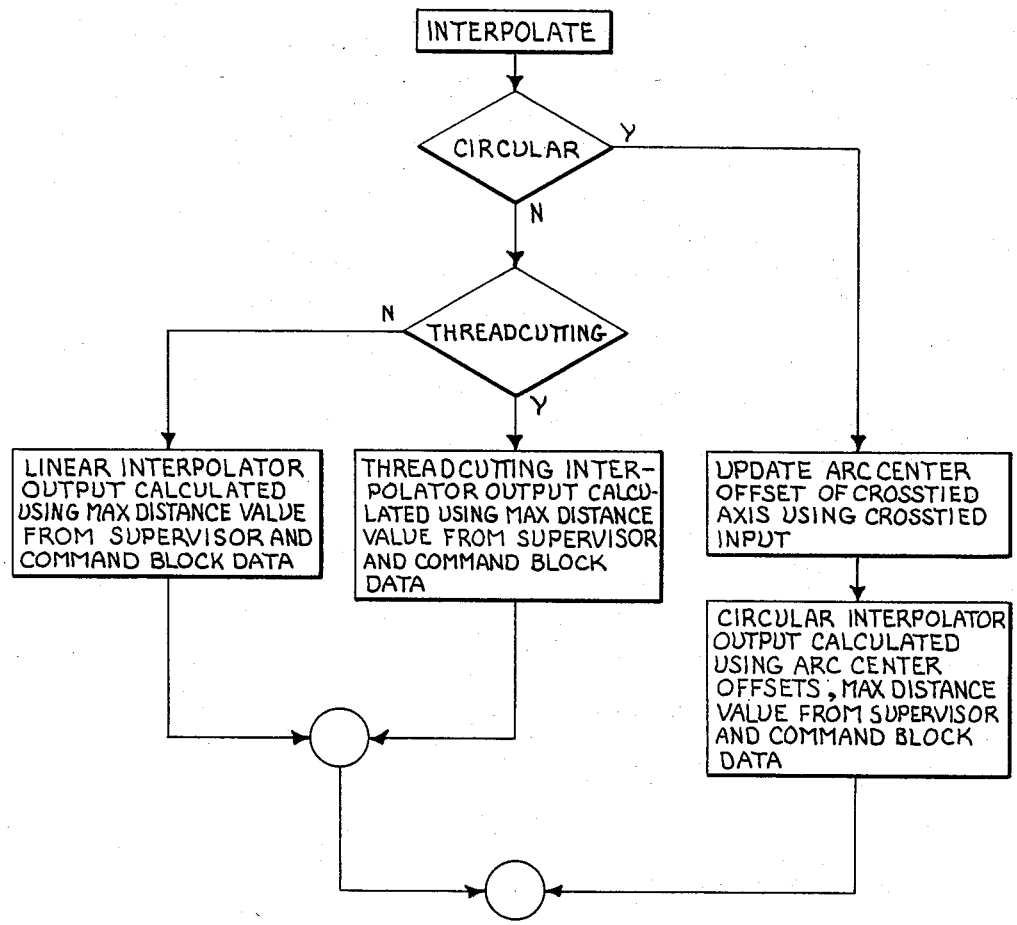

FIG. 10 illustrates the flow chart for the interpolate task shown in FIG. 9A. The first task is to determine whether the cutting process is circular or non-circular and if non-circular, then to determine whether or not the move is a threadcutting one. In the threadcutting interpolation, the output is calculated using the maximum distance value from the supervisory microprocessor and the command block data. For the threadcutting mode, the maximum distance value supplied by the supervisory processor is indicative of spindle angle change. Linear interpolation is also accomplished in the same manner. If the cutting process is circular, then the arc center offset of the cross-tied axis must be updated using the cross-tied data input. The cross-tied axis is the other axis in the plane of the circle. The cross-tied data is received through the broadcast mode. Thereafter the interpolator output is calculated using arc center offsets and the maximum incremental distance value from the supervisor microprocessor and command block data.

Figure 11:
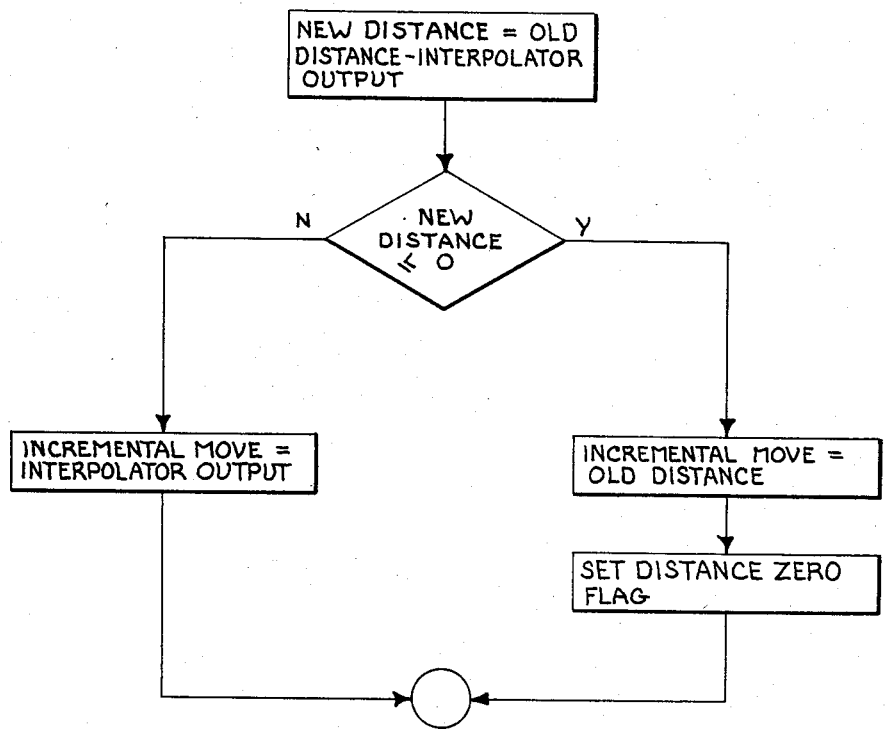

FIG. 11 illustrates the computed distance-to-go task of FIG. 9A. Each command block of data contains a total distance to be moved in that block. When a new command block of data is copied from buffer into internal memory, the old distance is set to this total distance-to-go for the new block of data. Each incremental move will decrement this distance. This task requires first to compute a new distance which is equal to the old distance minus the interpolator output distance. If the new distance calculated is greater than zero, then the incremental move is equal the interpolator output. If the new distance is less than or equal to zero, then the incremental move is set equal to the old distance, and a distance zero flag is set to be used in the motion complete data.

Figure 12:
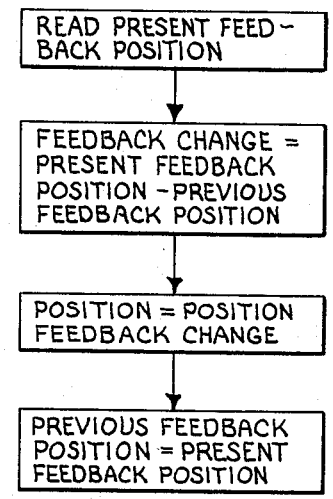

The task of measuring the feedback change is illustrated in FIG. 12. In this task the present position of the position feedback device is read from a present feedback position register in the servo interface circuits 46 shown in FIG. 3B, and the feedback change is determined by subtracting the previous position from the present position. This feedback position change is then algebraically added to a position register in which the total accumulated change from some initial zero reference is maintained. The present position is then stored in the previous position register. The computed value of feedback change is also used in computing position error, a task shown on the flow chart on FIG. 9 described earlier.

Although the particular implementation of the invention as disclosed herein has ben presented in a form useable in a Mark Century 2000 CNC, it will be apparent that the implementation can be easily adapted for use in other CNC systems by those having ordinary skill in the art. Instruction manuals, part programming manuals and maintenance for the Mark Century 2000 CNC describe in more detail the incorporation of the invention into a CNC system and also provide additional description of hardware for the system. The appended claims are therefore intended to cover and embrace any modifications of the invention, subject only to the true spirit and scope of the claims.

I claim:

1. A method for operating a computer numerical control (CNC) system for controlling an industrial machine system having a plurality of controllable axes of motion, the CNC system including a central processing unit, a plurality of supervisory processing units, a plurality of axis data processing units, input means for providing preliminary set-up data to the CNC system and communication bus means for providing communication between the processing units and the machine system, each of the axis data processing units being assigned to control a predetermined one of the axes of motion said method comprising the steps of:
   (a) providing data to each of the supervisory processing units defining a mode of operation for a group of axes of motion of the machine system to be controlled by a corresponding one of the supervisory processing units;
   (b) providing from the central processing unit to the axis data processing units instructions defining for each of the axis data processing units a supervisory processing unit controlling processing of data by each of the axis data processing units;
   (c) providing from the central processing unit to each of the axis data processing units data corresponding to a desired motion for the axis of motion controlled by a corresponding axis data processing unit; and
   (d) directing the supervisory processing units to force each of the axis data processing units to process the desired motion data whereby signals are provided from the axis data processing units to the machine system to cause the desired motion.

2. The method of claim 1 wherein said step of providing data to each supervisory processing unit comprises the sub-steps of:
   (a) providing preliminary set-up data to that supervisory processing unit defining an assigned number for that supervisory processing unit; and
   (b) identifying to that supervisory processing unit an assigned axis processing unit for supplying incremental motion data to that supervisory processing unit.

3. The method of claim 1 and including the steps of:
   (a) determining for each commanded motion a desired grouping of coordinated axes for effecting the motion; and
   (b) re-assigning axis data processors to the desired grouping.

4. The method of claim 1 and including the steps of:
   (a) interchanging incremental motion data between each processor of a coordinated pair of processors within an axis motion group; and
   (b) determining the incremental motion to be completed by each of the coordinated axis processors as a function of the interchanged incremental motion data.

5. The method of claim 4 wherein the data is interchanged by the steps of:

(a) writing from each processing unit to a corresponding external memory incremental motion data; and
(b) establishing a broadcast mode in which incremental motion data from each external memory is copied to all other ones of external memory.

6. The method of claim 1 wherein the CNC system includes a communication bus means for interchanging data between any processing units in a group comprising axis data processing units and supervisory processing units in which data is interchanged by the further steps of:
(a) writing data from each processing unit in a group to a corresponding external memory; and
(b) establishing a broadcast mode in which data from each external memory is copied to all other ones of external memory.

* * * * *